(12) United States Patent
Okamoto et al.

(10) Patent No.: US 12,466,925 B2
(45) Date of Patent: Nov. 11, 2025

(54) WATER-SOLUBLE FILM, METHOD OF MANUFACTURING SAME, AND PACKAGE

(71) Applicant: KURARAY CO., LTD., Okayama (JP)

(72) Inventors: Minoru Okamoto, Okayama (JP);
Sayaka Shimizu, Okayama (JP);
Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 588 days.

(21) Appl. No.: 17/359,960

(22) Filed: Jun. 28, 2021

(65) Prior Publication Data

US 2021/0324157 A1    Oct. 21, 2021

Related U.S. Application Data

(63) Continuation of application No. PCT/JP2019/051487, filed on Dec. 27, 2019.

(30) Foreign Application Priority Data

Dec. 28, 2018 (JP) .................................. 2018-248286

(51) Int. Cl.
  *C08J 5/18* (2006.01)
  *B41M 5/50* (2006.01)
  (Continued)

(52) U.S. Cl.
  CPC ................ *C08J 5/18* (2013.01); *B41M 5/502* (2013.01); *B65D 65/42* (2013.01); *B65D 65/46* (2013.01);
  (Continued)

(58) Field of Classification Search
  CPC ...... C08J 5/18; C08J 2329/04; C08J 2331/04; C08J 2403/04; B41M 5/502; B65D 65/42;
  (Continued)

(56) References Cited

U.S. PATENT DOCUMENTS 4,478,971 A    10/1984    Ballard
7,674,518 B2   3/2010     Hayakawa et al.
(Continued)

FOREIGN PATENT DOCUMENTS

CA    3001549 A1    10/2017
CN    1871138 A     11/2006
(Continued)

OTHER PUBLICATIONS

Machine Translation of WO-2015020046-A1 (Year: 2015).*
(Continued)

*Primary Examiner* — Brian Handville
(74) *Attorney, Agent, or Firm* — Morgan, Lewis & Bockius LLP

(57) ABSTRACT

Provided are a water-soluble film that causes less deformation of the package during storage, while maintaining excellent solubility in water, and is capable of suppressing the occurrence of tears and the like, a production method thereof, and a package using the water-soluble film. A water-soluble film of the present invention includes a polyvinyl alcohol resin. The water-soluble film has an amount (A1) of crystalline component of 60% or less and an amount (A2) of constrained amorphous component from 10% to 50%, the amounts being obtained from a spin-spin relaxation curve by $^1$H pulse NMR measurement of the water-soluble film in deuterated methanol. A ratio (A1/A2) of the amount (A1) of crystalline component to the amount (A2) of constrained amorphous component is preferably from 0.1 to 5.

19 Claims, 1 Drawing Sheet

(51) Int. Cl.
  B65D 65/42 (2006.01)
  B65D 65/46 (2006.01)
  C08K 5/053 (2006.01)
(52) U.S. Cl.
  CPC ........ *C08J 2329/04* (2013.01); *C08J 2331/04* (2013.01); *C08K 5/053* (2013.01)
(58) Field of Classification Search
  CPC .......... B65D 65/46; C08K 5/053; B29D 7/01; B44C 1/1758; B29C 41/26; B29C 41/28; B29K 2029/04; C08L 29/04
  See application file for complete search history.

(56) References Cited

U.S. PATENT DOCUMENTS

| | | | |
|---|---|---|---|
| 8,927,061 B2 | 1/2015 | Hikasa et al. | |
| 9,908,957 B2 | 3/2018 | Mori et al. | |
| 2003/0114332 A1* | 6/2003 | Ramcharan | C11D 17/0017 510/297 |
| 2007/0087171 A1 | 4/2007 | Hikasa et al. | |
| 2009/0291282 A1 | 11/2009 | Kitamura et al. | |
| 2011/0236608 A1 | 9/2011 | Vavassori Bisutti | |
| 2016/0002422 A1* | 1/2016 | Hochi | A61L 15/28 428/216 |
| 2016/0102279 A1 | 4/2016 | Labeque et al. | |
| 2016/0194465 A1 | 7/2016 | Takafuji et al. | |
| 2016/0340456 A1 | 11/2016 | Mori et al. | |
| 2017/0233539 A1 | 8/2017 | Friedrich et al. | |
| 2017/0259975 A1 | 9/2017 | Yonezawa et al. | |
| 2017/0298155 A1 | 10/2017 | Takafuji et al. | |
| 2017/0355938 A1 | 12/2017 | Lee et al. | |
| 2018/0245028 A1 | 8/2018 | Ookubo et al. | |
| 2018/0251613 A1 | 9/2018 | Hiura et al. | |
| 2019/0135997 A1* | 5/2019 | Friedrich | C11D 17/043 |
| 2020/0063076 A1 | 2/2020 | Hiura | |
| 2021/0171882 A1 | 6/2021 | Tanikawa et al. | |

FOREIGN PATENT DOCUMENTS

| | | | |
|---|---|---|---|
| CN | 107746467 A | 3/2018 | |
| EP | 0347219 A1 | 12/1989 | |
| EP | 3348605 A1 | 7/2018 | |
| EP | 3348608 A1 | 7/2018 | |
| EP | 3677405 A1 | 7/2020 | |
| EP | 3904035 A1 | 11/2021 | |
| EP | 3904231 A1 | 11/2021 | |
| EP | 3904232 A1 | 11/2021 | |
| JP | H06-138321 A | 5/1994 | |
| JP | H10-296820 A | 11/1998 | |
| JP | 2000296529 A | 10/2000 | |
| JP | 2001329130 A | 11/2001 | |
| JP | 2002-020507 A | 1/2002 | |
| JP | 2002-030162 A | 1/2002 | |
| JP | 2002020506 A | 1/2002 | |
| JP | 2002-241797 A | 8/2002 | |
| JP | 2002-347112 A | 12/2002 | |
| JP | 2005-194295 A | 7/2005 | |
| JP | 2005179390 A | 7/2005 | |
| JP | 2010-155453 A | 7/2010 | |
| JP | 2014-016649 A | 1/2014 | |
| JP | 2015057629 A | 3/2015 | |
| JP | WO2015/118978 A1 | 8/2015 | |
| JP | 2016060746 A | 4/2016 | |
| JP | WO2016/084836 A1 | 6/2016 | |
| JP | 2016-150769 A | 8/2016 | |
| JP | 2016-222834 A | 12/2016 | |
| JP | WO2016/190235 A1 | 12/2016 | |
| JP | WO2015/020046 A1 | 3/2017 | |
| JP | WO2017/043505 A1 | 3/2017 | |
| JP | WO2017/043509 A1 | 3/2017 | |
| JP | 2017-078166 A | 4/2017 | |
| JP | 2017-095679 A | 6/2017 | |
| JP | 2017-110213 A | 6/2017 | |
| JP | 2017-114931 A | 6/2017 | |
| JP | 2017-115128 A | 6/2017 | |
| JP | 2017-119434 A | 7/2017 | |
| JP | 2017-119853 A | 7/2017 | |
| JP | 2017-217866 A | 12/2017 | |
| JP | WO2018/230583 A1 | 12/2018 | |
| JP | 2019-044021 A | 3/2019 | |
| JP | WO2019/198683 A1 | 10/2019 | |
| WO | 2009/075202 A1 | 6/2009 | |
| WO | 2013/146147 A1 | 10/2013 | |
| WO | 2014/050696 A1 | 4/2014 | |
| WO | WO-2015020046 A1 * | 2/2015 | ............ C08F 216/06 |
| WO | 2017/043508 A1 | 3/2017 | |
| WO | 2017043514 A1 | 3/2017 | |
| WO | 2019/044751 A1 | 3/2019 | |

OTHER PUBLICATIONS

Office Action issued in Japanese Patent Application No. 2020-562511 (corresponding to U.S. Appl. No. 17/360,004) dated Jan. 16, 2023.
Office Action issued in Japanese Patent Application No. 2020-562512 (corresponding to U.S. Appl. No. 17/360,018) dated Jan. 16, 2023.
Office Action issued in Chinese Patent Application No. 201980086862.1 (corresponding to U.S. Appl. No. 17/359,952) dated Dec. 5, 2022.
Office Action issued in Chinese Patent Application No. 201980086856.6 (corresponding to U.S. Appl. No. 17/359,960) dated Dec. 27, 2022.
Office Action issued in Chinese Patent Application No. 201980086861.7 (corresponding to U.S. Appl. No. 17/360,040) dated Dec. 7, 2022.
Office Action issued in Chinese Patent Application No. 201980086834.X (corresponding to U.S. Appl. No. 17/360,098) dated Dec. 8, 2022.
Office Action issued in the U.S. Appl. No. 17/360,098, dated Sep. 27, 2023.
Office Action issued in the U.S. Appl. No. 17/360,004, dated Oct. 11, 2023.
Office Action issued in the U.S. Appl. No. 17/360,018, dated Oct. 11, 2023.
Office Action issued in the JP Patent Application No. 2020-562512, dated Nov. 28, 2023 (corresponding to U.S. Appl. No. 17/360,018).
Written opposition on JP Application No. 2020-562508, Patent No. 7240420, dispatched on Oct. 18, 2023 (received Oct. 20, 2023) - concise explanation in English attached (corresponding to U.S. Appl. No. 17/359,952).
Notice of reasons for revocation on JP Application No. 2020-562508, Patent No. 7240420, dispatched on Nov. 15, 2023 (received Nov. 17, 2023)—concise explanation in English attached (corresponding to U.S. Appl. No. 17/359,952).
Trial and Appeal Decision No. 2020-35529, issued on JP Patent No. 2543748.
Extended European Search Report issued in related European Patent Application No. 19901491.1 dated Aug. 18, 2022.
Extended European Search Report issued in related European Patent Application No. 19905634.2 dated Aug. 30, 2022.
Shiga et al., "Pulsed NMR Study of the Structure of Poly(vinyl alcohol)-Poly(sodium acrylate) Composite Hydrogel," Journal of Polymer Science: Part B: Polymer Physics, 32: 85-90 (1994).
Takigawa et al., "Structure and mechanical properties of poly(vinyl alcohol) gels swollen by various solvents," Polymer, 33 (11): 2334-2339 (1992).
Extended European Search Report issued in related European Patent Application No. 19903285.5 dated Aug. 24, 2022.
Extended European Search Report issued in related European Patent Application No. 19905828.0 dated Sep. 14, 2022.
Extended European Search Report issued in related European Patent Application No. 19905635.9 dated Sep. 14, 2022.
Extended European Search Report issued in related European Patent Application No. 19902016.5 dated Aug. 18, 2022.
Extended European Search Report issued in related European Patent Application No. 19901493.7 dated Aug. 24, 2022.
Jang et al., "Plasticizer effect on the melting and crystallization behavior of polyvinyl alcohol," Polymer, 44: 8139-8146 (2003).

(56) References Cited

OTHER PUBLICATIONS

Peppas, "Infrared spectroscopy of semicrystalline poly(vinyl alcohol) networks," Die Makromolekulare Chemie, 178 (2):595-601 (1977) (English abstract only).
Extended European Search Report issued in related European Patent Application No. 19903286.3 dated Aug. 24, 2022.
Extended European Search Report issued in related European Patent Application No. 19905031.1 dated Sep. 1, 2022.
Office Action issued in U.S. Appl. No. 17/360,040 dated Jul. 7, 2023.
Second Office Action issued in Chinese Patent Application No. 201980086859.X dated Jul. 3, 2023, corresponding to U.S. Appl. No. 17/359,991.
International Search Report issued in related International Patent Application No. PCT/JP2019/051487 dated Mar. 24, 2020.
Office Action issued in Japanese Patent Application No. 2020-562508 (corresponding to U.S. Appl. No. 17/359,952) dated Oct. 4, 2022.
Office Action issued in Japanese Patent Application No. 2020-562509 (corresponding to U.S. Appl. No. 17/359,960) dated Oct. 4, 2022.
Office Action issued in Japanese Patent Application No. 2020-562516 (corresponding to U.S. Appl. No. 17/360,098) dated Oct. 4, 2022.
Office Action issued in Japanese Patent Application No. 2020-562510 (corresponding to U.S. Appl. No. 17/359,991) dated Oct. 25, 2022.
Office Action issued in Japanese Patent Application No. 2020-562513 (corresponding to U.S. Appl. No. 17/360,040) dated Nov. 22, 2022.
Office Action issued in Japanese Patent Application No. 2020-562515 (corresponding to U.S. Appl. No. 17/360,076) dated Sep. 13, 2022.
Office Action issued in related Chinese Patent Application No. 201980086843.9 dated Jul. 25, 2022.
Office Action issued in related Chinese Patent Application No. 201980086787.9 dated Aug. 2, 2022.
Office Action issued in Japanese Patent Application No. 2020-562512 corresponding to U.S. Appl. No. 17/360,018 dated Jun. 20, 2023.
Office Action issued in Chinese Patent Application No. 201980086856.6 corresponding to U.S. Appl. No. 17/359,960 dated Jun. 21, 2023.
Office Action issued in Chinese Patent Application No. 201980086787.9 corresponding to U.S. Appl. No. 17/360,004 dated Apr. 12, 2023.
Office Action issued in Chinese Patent Application No. 201980086844.3 corresponding to U.S. Appl. No. 17/360,055 dated Jun. 8, 2023.
Notice of Reasons for Refusal issued in Japanese Patent Application No. 2020-562510 corresponding to U.S. Appl. No. 17/359,991 dated Apr. 10, 2023.
Decision of Refusal issued in Japanese Patent Application No. 2020-562511 corresponding to U.S. Appl. No. 17/360,004 dated Mar. 29, 2023.
Office Action issued in Chinese Patent Application No. 201980086859.X corresponding to U.S. Appl. No. 17/359,991 dated Mar. 3, 2023.
Office Action issued in Chinese Patent Application No. 201980086844.3 corresponding to U.S. Appl. No. 17/360,055 dated Mar. 2, 2023.
Office Action issued in Chinese Patent Application No. 201980086857.0 corresponding to U.S. Appl. No. 17/360,076 dated Feb. 18, 2023.
Office Action issued in Chinese Patent Application No. 201980086834.X corresponding to U.S. Appl. No. 17/360,098 dated Feb. 23, 2023.
Office Action issued in Taiwanese Patent Application No. 108148017 corresponding to U.S. Appl. No. 17/360,098 dated Jan. 19, 2023.
Office Action issued in the U.S. Appl. No. 17/360,076, dated Feb. 12, 2024.
Office Action issued in the U.S. Appl. No. 17/359,991, dated Feb. 28, 2024.
Office Action issued in the U.S. Appl. No. 17/360,018, dated Mar. 26, 2024.
Office Action issued in the U.S. Appl. No. 17/360,004, dated Mar. 26, 2024.
Non-Final Office Action issued in the corresponding U.S. Appl. No. 17/360,076, dated Oct. 15, 2024.
Office Action issued in the U.S. Appl. No. 17/360,055, dated Apr. 11, 2024.
Office Action issued in the corresponding U.S. Appl. No. 17/360,055, mailed Aug. 27, 2024.
Office Action issued in the corresponding U.S. Appl. No. 17/360,076, mailed Jul. 17, 2024.
Office Action issued in the corresponding U.S. Appl. No. 17/359,952, mailed Sep. 27, 2024.

\* cited by examiner

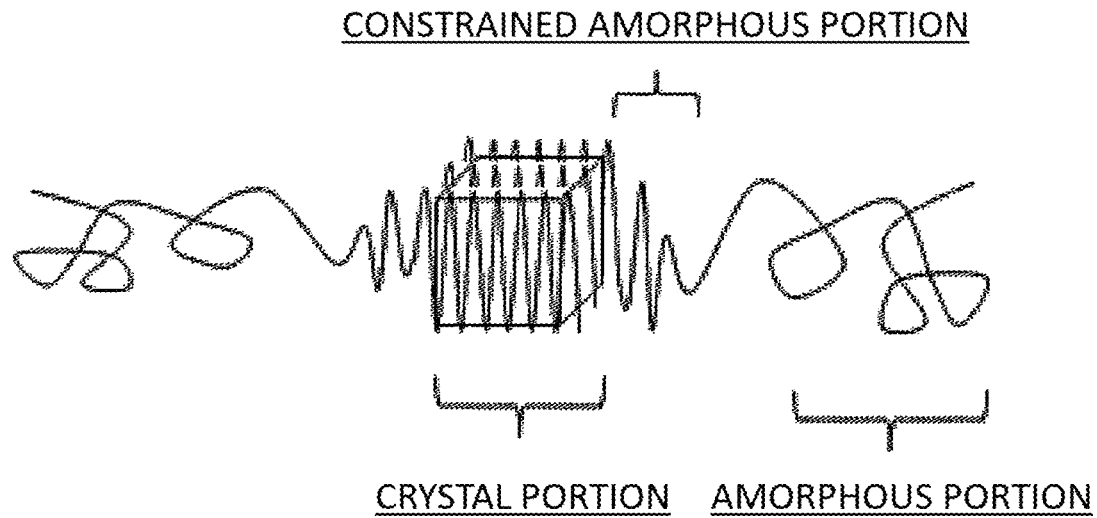

WATER-SOLUBLE FILM, METHOD OF MANUFACTURING SAME, AND PACKAGE

TECHNICAL FIELD

The present invention relates to a polyvinyl alcohol resin-containing water-soluble film preferably used for packaging various chemicals and the like, a production method thereof, and a package.

BACKGROUND ART

In the related art, water-soluble films have been used in a wide range of fields, including packaging of various chemicals, such as liquid detergents, pesticides, and germicides, and seed tapes encapsulating seeds, taking advantage of excellent solubility in water.

For water-soluble films to be used for the applications as described above, polyvinyl alcohol resins (hereinafter, may be simply referred to as "PVAs") are mainly used. Water-soluble films are disclosed that have increased water solubility by adding various additives, such as plasticizers, and by using modified polyvinyl alcohol (e.g., refer to PTL 1).

There is a technique called pulse NMR (nuclear magnetic resonance) used as a method of obtaining abundance ratios of respective moving components (crystalline component, constrained amorphous component, and amorphous component) in an optical PVA film (e.g., refer to PTL 2).

However, the correlation between the abundance ratios of the respective moving components obtained by pulse NMR and various kinds of performance expected from such a water-soluble film has not been investigated yet.

CITATION LIST

Patent Literature

PTL 1: JP 2017-078166 A
PTL 2: WO 2015/020046

SUMMARY OF INVENTION

Technical Problem

The water-soluble film disclosed in PTL 1 reduces the degree of crystallization to increase the water solubility by adjusting the amount of the plasticizer and the like to be added and by using modified polyvinyl alcohol.

However, simple reduction in the degree of crystallization causes the water-soluble film to have low mechanical strength and to be soft. Preparation of packages encapsulating (packaging) a liquid detergent or the like by using the water-soluble film used to cause a problem that deformation, tears, and the like occur in the packages during storage (during transport).

The present invention provides a water-soluble film that causes, while maintaining excellent solubility in water, less deformation of a package during storage and is capable of suppressing the occurrence of tears and the like, a production method thereof, and a package using the water-soluble film.

Solution to Problem

The present inventors have found that the above problems are solved by keeping the amount of crystalline component in the water-soluble film containing a polyvinyl alcohol resin and the amount of constrained amorphous in specific ranges component to complete the present invention.

That is, the present invention relates to [1] through [12] below.

[1] A water-soluble film including a polyvinyl alcohol resin, wherein
the water-soluble film has an amount (A1) of crystalline component of 60% or less and an amount (A2) of constrained amorphous component from 10% to 50%, the amounts being obtained from a spin-spin relaxation curve by $^1$H pulse NMR measurement of the water-soluble film in deuterated methanol.

[2] The water-soluble film according to [1] above, wherein a ratio (A1/A2) of the amount (A1) of crystalline component to the amount (A2) of constrained amorphous component is from 0.1 to 5.

[3] The water-soluble film according to [1] or [2] above, wherein a ratio (A2/A3) of the amount (A2) of constrained amorphous component to an amount (A3) of amorphous component obtained from the spin-spin relaxation curve is 1.5 or less.

[4] The water-soluble film according to any one of [1] through [3] above, wherein complete dissolution time of the water-soluble film immersed in deionized water at 10° C. is 150 seconds or less.

[5] The water-soluble film according to any one of [1] through [4] above, wherein the water-soluble film has a thickness of 200 µm or less.

[6] A method of producing the water-soluble film according to any one of [1] through [5] above, including:
preparing a film forming stock solution containing the polyvinyl alcohol resin and a solvent;
forming a liquid coating by feeding the film forming stock solution on a rotating support; and
obtaining the water-soluble film by removing the solvent from the liquid coating on the support.

[7] The method of producing the water-soluble film according to [6] above, wherein the film forming stock solution further contains 10 parts by mass or more of a plasticizer based on 100 parts by mass of the polyvinyl alcohol resin.

[8] The method of producing the water-soluble film according to [6] or [7] above, wherein S1/S0 is 7 or less when a feeding rate of the film forming stock solution on the support is S0 [m/second] and a rotation speed of the support is S1 [m/second].

[9] The method of producing the water-soluble film according to any one of [6] through [8] above, wherein the support has a surface temperature from 50° C. to 110° C.

[10] The method of producing the water-soluble film according to any one of [6] through [9] above, further including heat treating the water-soluble film thus obtained at a temperature from 60° C. to 135° C.

[11] A package including:
a packaging material composed of the water-soluble film according to any one of [1] through [5] above; and
a chemical encapsulated in the packaging material.

[12] The package according to [11] above, wherein the chemical is a pesticide, a detergent, or a germicide.

Advantageous Effects of Invention

According to the present invention, it is possible to provide a water-soluble film having excellent solubility in water, causing less deformation of a package during storage, and capable of suppressing the occurrence of tears and the like, a production method thereof, and a package using the water-soluble film.

BRIEF DESCRIPTION OF THE DRAWINGS

FIG. 1 is a diagram schematically illustrating the crystal structure in a film.

DESCRIPTION OF EMBODIMENTS

The present invention is specifically described below.

A water-soluble film of the present invention contains a polyvinyl alcohol resin (PVA). The water-soluble film has an amount (A1) of crystalline component of 60% or less and an amount (A2) of constrained amorphous component from 10% to 50%, the amounts being obtained from a spin-spin relaxation curve by $^1$H pulse NMR measurement of the water-soluble film in deuterated methanol.

It should be noted that, in the description below, the water-soluble film of the present invention may be referred to as a "PVA film".

Pulse NMR

The pulse NMR is, different from versatile NMR used for structure determination of organic compounds and the like, an analysis method capable of measuring relaxation time of the $^1$H nucleus related to the molecular mobility in the system. Using the high quantitative performance of the pulse NMR, it is possible to obtain abundance ratios of respective moving components in the system.

In a pulse NMR measurement apparatus, a static magnetic field is generated by an electromagnet in the apparatus. In the static magnetic field, the orientation of the nuclear spin of the hydrogen nucleus is oriented in the direction along the static magnetic field. Addition of a pulsed magnetic field in this state causes the nuclear spin of the hydrogen nucleus to be in a state tilted 90° (excited state) from the direction along the static magnetic field. Then, the orientation of the nuclear spin thus excited macroscopically returns to the original direction along the static magnetic field.

Process of the orientation of the nuclear spin returning from the excited state to the original state is referred to as "T2 relaxation" and the time taken for the process is referred to as relaxation time (tau). In the case of single component relaxation, magnetization intensity (y) at time (t) is represented by a formula below using intensity (a) in the excited state, relaxation time (tau), and constants (y0, W).

$$y = y0 + a \times \exp(-1/W \times (t/tau)^w) \quad \text{(Math 1)}$$

It should be noted that W is called as a Weibull modulus, and in the case of W=1, the formula is exp type, and in the case of W=2, the formula is gauss type. In the case of a general, polymer W ranges 1≤W≤2.

In the case of T2 relaxation, the hydrogen nucleus attenuates from the excited state to the original state while exchanging energy with other hydrogen nuclei. Accordingly, in the case that a sample has high molecular mobility, interaction between neighboring protons is weak and thus energy is less likely to attenuates in the entire system, causing longer relaxation time. In contrast, in the case that a sample has low molecular mobility, the relaxation time becomes short.

Thus, in a crystalline polymer, the crystalline component has a short relaxation time and the amorphous component has a long relaxation time. In addition, a constrained amorphous component (refer to FIG. 1), which is a boundary between the crystalline component and the amorphous component, has an intermediate relaxation time between them.

While usual X-ray measurement and the like can only measure the amount of crystalline component and the amount of amorphous component, pulse NMR can measure the amount of constrained amorphous component in addition to the amount of crystalline component and the amount of amorphous component. Particularly in pulse NMR, the abundance ratios of the respective moving components are determined based on the mobility of the crystalline polymer not available from X-ray measurement. The abundance ratios are values more accurately reflecting various kinds of performance expected from such a water-soluble film. Use of pulse NMR thus allows very appropriate evaluation of the water-soluble film properties.

It should be noted that the crystalline component, the constrained amorphous component, and the amorphous component are mixed in an actual crystalline polymer. A relaxation curve obtained by pulse NMR measurement of the water-soluble film containing the crystalline polymer is thus observed as a sum of the relaxation component derived from the crystalline component with a short relaxation time, the relaxation component derived from the amorphous component with a long relaxation time, and the relaxation component derived from the constrained amorphous component with a relaxation time approximately intermediate between them.

In the present invention, a relaxation curve obtained by the method of linear least squares is fit to a formula below. When the crystalline component has a relaxation time tau1, the constrained amorphous component has a relaxation time tau2, and the amorphous component has a relaxation time tau3, the magnetization intensity (y) of the entire sample at time (t) is represented by the formula below using the constant y0 and a1, a2, and a3 in the excited state.

$$y = y0 + a1 \times \exp(-1/W1 \times (t/tau1)^{w1}) + a2 \times \exp(-1/W2 \times (t/tau2)^{w2}) + a3 \times \exp(-1/W3 \times (t/tau3)^{w3}) \quad \text{(Math 2)}$$

As a result of an intensive examination in this process, a formula below where the crystalline component and the constrained amorphous component are respectively attributed to gauss type relaxation (W1, W2=2) and the amorphous component is attributed to exp type relaxation (W3=1), and the relaxation times are fixed to tau1=0.01 ms, tau1=0.05 ms, and tau3=0.50 ms is used as a formula (fitting function formula) stably and reproducibly fittable to films produced under respective film formation conditions.

$$y = y0 + a1 \times \exp(-0.5 \times (t/0.01)^2) + a2 \times \exp(-0.5 \times (t/0.05)^2) + a3 \times \exp(-t/0.50) \quad \text{(Math 3)}$$

In the present invention, a1, a2, a3, and y0 drawn from the above formula are obtained to define ratios (%) of the respective components based on the total (a1+a2+a3) of a1, a2, and a3 as an amount (A1) of crystalline component, an amount (A2) of constrained amorphous component, and an amount (A3) of amorphous component. For example, the value of the amount (A2) of constrained amorphous component is represented by a2/(a1+a2+a3)×100.

The amount (A1) of crystalline component is 60% or less. More than 60% of the amount (A1) of crystalline component causes insufficient water solubility of the PVA film. The upper limit of the amount (A1) of crystalline component may be 60% or less, preferably 55% or less, and even more preferably 50% or less. Meanwhile, the lower limit of the amount (A1) of crystalline component is preferably, but not particularly limited to, 10% or more and more preferably 20% or more. The amount (A1) of crystalline component in the above range allows impartation of high water solubility to the PVA film while preventing insufficient mechanical strength of the PVA film.

The amount (A2) of constrained amorphous component is from 10% to 50%. The lower limit of the amount (A2) of constrained amorphous component is preferably, but not particularly limited to, 15% or more and more preferably 20% or more. Meanwhile, the upper limit of the amount (A2) of constrained amorphous component is preferably, but not particularly limited to, 45% or less and more preferably 40% or less. The amount (A2) of constrained amorphous component in the above range allows preferable suppression of deformation of the package to be obtained.

The lower limit of the amount (A3) of amorphous component is preferably, but not particularly limited to, 10% or more, more preferably 20% or more, and even more preferably 30% or more. Meanwhile, the upper limit of the amount (A3) of amorphous component is preferably, but not particularly limited to, 70% or less, more preferably 60% or less, and even more preferably 50% or less. The amount (A3) of amorphous component in the above range allows improvement of the water solubility of the PVA film while maintaining high mechanical strength of the PVA film.

A ratio (A1/A2) of the amount (A1) of crystalline component to the amount (A2) of constrained amorphous component is preferably, but not particularly limited to, from 0.1 to 5. The upper limit of (A1/A2) is more preferably 2 or less. Meanwhile, the lower limit of (A1/A2) is more preferably, but not particularly limited to, 0.5 or more. (A1/A2) in the above range allows sufficient maintenance of both water solubility and mechanical strength of the PVA film.

A ratio (A2/A3) of the amount (A2) of constrained amorphous component to the amount (A3) of amorphous component is preferably, but not particularly limited to, 1.5 or less. The upper limit of (A2/A3) is more preferably 1.3 or less and even more preferably 1.0 or less. Meanwhile, the lower limit of (A2/A3) is more preferably, but not particularly limited to, 0.1 or more. (A2/A3) in the above range allows good balance of the water solubility and the mechanical strength of the PVA film.

In the present invention, it is important to control the parameters as described above in the above ranges. Examples of the method of controlling the parameters include: a method that adjusts a kind (degree of saponification, amount of modification, mixing ratio of unmodified PVA/modified PVA, etc.) of the polyvinyl alcohol resin; a method that adjusts an amount of a plasticizer to be added; a method that adjusts film production conditions (surface temperature of support, heat treatment conditions, etc.); or a method of adjustment by combining the methods described above.

Polyvinyl Alcohol Resin

The water-soluble film (PVA film) of the present invention contains a polyvinyl alcohol resin (PVA).

As the PVA, it is possible to use a polymer produced by saponifying a vinyl ester polymer obtained by polymerizing a vinyl ester monomer.

Examples of the vinyl ester monomer include vinyl formate, vinyl acetate, vinyl propionate, vinyl valerate, vinyl laurate, vinyl stearate, vinyl benzoate, vinyl pivalate, vinyl versatate, and the like. Among those mentioned above, vinyl acetate is preferred as the vinyl ester monomer.

The vinyl ester polymer is preferably, but not particularly limited to, a polymer obtained using only one or more kinds of vinyl ester monomer as the monomer and more preferably a polymer obtained using only one kind of vinyl ester monomer as the monomer. It should be noted that the vinyl ester polymer may be a copolymer of one or more kinds of vinyl ester monomer and another monomer copolymerizable with the one or more kinds of vinyl ester monomer.

Examples of such another monomer include: ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like.

It should be noted that the vinyl ester polymer may have a structural unit derived from one or more kinds of such another monomer described above.

A higher ratio of the structural unit derived from such another monomer to the vinyl ester polymer tends to cause a smaller amount (A1) of crystalline component and a smaller ratio (A2/A3) of the amount (A2) of constrained amorphous component to the amount (A3) of amorphous component. This tendency is assumed to be because an increase in the structural unit derived from such another monomer causes reduction in the interaction between the molecules of PVA and thus crystallization by heat treatment does not readily proceed. From the perspective of facilitating adjustment of the amount (A1) of crystalline component, the amount (A2) of constrained amorphous component, and the ratio of the amount (A1) of crystalline component to the amount (A2) of constrained amorphous component in desired ranges and increasing both water solubility and mechanical strength of the PVA film, the ratio of the structural unit derived from such another monomer is preferably, but not particularly limited to, 15 mol % or less based on the number of moles of the total structural units constituting the vinyl ester polymer and more preferably 5 mol % or less.

The degree of polymerization of the PVA is preferably, but not particularly limited to, in a range below. That is, the lower limit of the degree of polymerization is preferably 200 or more from the perspective of maintaining sufficient mechanical strength of the PVA film, more preferably 300 or more, and even more preferably 500 or more. Meanwhile, the upper limit of the degree of polymerization is preferably, but not particularly limited to, 8,000 or less from the perspective of increasing productivity of the PVA, productivity of the PVA film, and the like, more preferably 5,000 or less, and even more preferably 3,000 or less.

In this context, the degree of polymerization means an average degree of polymerization measured in accordance with the description of JIS K 6726-1994. That is, the degree of polymerization herein is obtained by the following formula from the limiting viscosity [η] (unit: deciliter/g) measured, after resaponifying and purifying residual acetic acid groups in the PVA, in water at 30° C.

$$\text{Degree of Polymerization } Po=([\eta]\times 10^4/8.29)^{(1/0.62)} \quad \text{(Math 4)}$$

A higher degree of saponification of the PVA tends to cause a larger amount (A1) of crystalline component and to cause a larger ratio (A1/A2) of the amount (A1) of crystalline component to the amount (A2) of constrained amorphous component. This tendency is assumed to be because a higher degree of saponification causes an increase in interaction between the hydroxyl groups in the molecules of the PVA and thus the crystallization by heat treatment readily proceeds. In the present invention, the degree of saponification of the PVA is preferably, but not particularly limited to, from 64 to 97 mol %. Adjustment of the degree of saponification of the PVA in the range from 64 to 97 mol % facilitates adjustment of the amount (A1) of crystalline component, the amount (A2) of constrained amorphous component, and the ratio of the amount (A1) of crystalline component to the amount (A2) of constrained amorphous component in desired ranges and thus facilitates achievement of both the water solubility and the mechanical strength of the PVA film. The lower limit of the degree of saponification is more preferably, but not particularly limited to, 70 mol % or more and even more preferably 75 mol % or more. Meanwhile, the upper limit of the degree of saponification is more preferably, but not particularly limited to, 93 mol % or less, even more preferably 91 mol % or less, and particularly preferably 90 mol % or less.

In this context, the degree of saponification of the PVA means a ratio (mol %) indicating the number of moles of the vinyl alcohol units based on the total number of moles of the structural units (typically, vinyl ester monomer units) that may be converted to vinyl alcohol units by saponification and the vinyl alcohol units.

The degree of saponification of the PVA may be measured in accordance with the description of JIS K 6726-1994.

The PVA film may contain one kind of PVA singly or may contain two or more kinds of PVA having a degree of polymerization, a degree of saponification, a degree of modification, and the like different from each other.

The upper limit of the PVA content in the PVA film is preferably, but not particularly limited to, 100 mass % or less. Meanwhile, the lower limit of the PVA content is preferably, but not particularly limited to, 50 mass % or more, more preferably 80 mass % or more, and even more preferably 85 mass % or more.

Plasticizer

The PVA film preferably contains, but not particularly limited to, a plasticizer. The plasticizer thus contained allows impartation of flexibility equivalent to other plastic films to the PVA film. The PVA film thus has better mechanical strength, such as impact strength, processability during fabrication, and the like.

Examples of the plasticizer include polyhydric alcohols, such as ethylene glycol, glycerin, diglycerin, propylene glycol, diethylene glycol, triethylene glycol, tetraethylene glycol, trimethylolpropane, and sorbitol, and the like. One kind of these plasticizers may be singly used or two or more kinds of them may be used together. Among those mentioned above, for the reasons of not readily bleeding out on a surface of the PVA film and the like, the plasticizer is preferably, but not particularly limited to, ethylene glycol or glycerin and more preferably glycerin.

The lower limit of the content of the plasticizer in the PVA film is preferably, but not particularly limited to, 1 part by mass or more based on 100 parts by mass of the PVA, more preferably 3 parts by mass or more, and even more preferably 5 parts by mass or more. Meanwhile, the upper limit of the content of the plasticizer is preferably, but not particularly limited to, 70 parts by mass or less based on 100 parts by mass of the PVA, more preferably 50 parts by mass or less, and even more preferably 40 parts by mass or less. The content of the plasticizer in the above range sufficiently enables an effect of improving the mechanical strength, such as impact strength, in the PVA film. It is also possible to preferably prevent or suppress the problems of reducing the handleability, bleeding out on the surface, and the like due to excessive flexibility of the PVA film.

By changing the content of the plasticizer, it is possible to adjust the abundance ratios of the respective moving components (crystalline component, constrained amorphous component, and amorphous component) in PVA.

Although differing depending on the primary structure of the molecular chain of the PVA, a PVA film containing a small amount of the plasticizer generally facilitates proceedings of crystallization by heat treatment compared with a PVA film not containing the plasticizer. This is assumed to be because the molecules of the PVA are facilitated to move and thus facilitated to form a crystal or constrained amorphous structure, which is energetically more stable.

In contrast, a PVA film containing an excessive amount of the plasticizer exhibits a tendency to inhibit proceedings of crystallization. This tendency is assumed to be because the amount of the plasticizer interacting with the hydroxyl groups in the molecules of PVA is large to cause reduction in the interaction between the molecules of PVA.

For these reasons, in order to regulate the amount (A1) of crystalline component and the amount (A2) of constrained amorphous component and the ratio of the amount (A1) of crystalline component and the amount (A2) of constrained amorphous component in the PVA film within appropriate ranges, the content of the plasticizer is preferably from 10 to 70 parts by mass based on 100 parts by mass of the PVA.

Starch/Water-Soluble Polymer

The PVA film may contain at least one of starch and a water-soluble polymer other than PVA. The at least one of starch and a water-soluble polymer other than PVA thus contained allows impartation of mechanical strength to the PVA film, maintenance of moisture resistance of the PVA film during handling, regulation of the rate of flexibilizing the PVA film due to water absorption during dissolution, or the like.

Examples of the starch include: natural starches, such as corn starch, potato starch, sweet potato starch, wheat starch, rice starch, tapioca starch, and sago starch; processed starches subjected to etherification, esterification, oxidation, and the like; and the like, and processed starches are particularly preferred.

The content of the starch in the PVA film is preferably, but not particularly limited to, 15 parts by mass or less based on 100 parts by mass of the PVA and more preferably 10 parts by mass or less. By keeping the content of the starch in the above range, it is possible to prevent or inhibit worsening of the processability of the PVA film.

Examples of the water-soluble polymer other than PVA include dextrin, gelatin, glue, casein, shellac, gum arabic, polyacrylic acid amide, sodium polyacrylate, polyvinyl methyl ether, copolymers of methyl vinyl ether and maleic anhydride, copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

The content of the water-soluble polymer other than PVA in the PVA film is preferably, but not particularly limited to, 15 parts by mass or less based on 100 parts by mass of the PVA and more preferably 10 parts by mass or less. The content of the water-soluble polymer other than PVA in the above range allows a sufficient increase in the water solubility of the PVA film.

Surfactant

The PVA film preferably contains, but not particularly limited to, a surfactant. The surfactant thus contained allows improvement of the handleability of the PVA film and the releasability of the PVA film from the film formation apparatus during production.

The surfactant is not particularly limited and, for example, anionic surfactants, nonionic surfactants, and the like may be used.

Examples of such an anionic surfactant include: carboxylic acid-based surfactants, such as potassium laurate; sulfuric ester-based surfactants, such as octyl sulfate; sulfonic acid-based surfactants, such as dodecylbenzenesulfonate; and the like.

Examples of such a nonionic surfactant include: alkyl ether-based surfactants, such as polyoxyethylene lauryl ether and polyoxyethylene oleyl ether; alkylphenyl ether-based surfactants, such as polyoxyethylene octylphenyl ether; alkyl ester-based surfactants, such as polyoxyethylene laurate; alkylamine-based surfactants, such as polyoxyethylene laurylamino ether; alkylamide-based surfactants, such as polyoxyethylene lauric acid amide; polypropylene glycol ether-based surfactants, such as polyoxyethylene polyoxypropylene ether; alkanolamide-based surfactants, such as lauric acid diethanolamide and oleic acid diethanolamide; allyl phenyl ether-based surfactants, such as polyoxyalkylene allyl phenyl ether; and the like.

One kind of these surfactants may be singly used or two or more kinds of them may be used together. Among the surfactants mentioned above, due to an excellent effect of reducing surface irregularities during formation of such a PVA film and the like, the surfactant is preferably, but not particularly limited to, nonionic surfactants, more preferably alkanolamide-based surfactants, and even more preferably dialkanolamide (e.g., diethanolamide, etc.) of aliphatic carboxylic acid (e.g., saturated or unsaturated aliphatic carboxylic acid having a carbon number from 8 to 30, etc.).

The lower limit of the content of the surfactant in the PVA film is preferably, but not particularly limited to, 0.01 part by mass or more based on 100 parts by mass of the PVA, more preferably 0.02 parts by mass or more, and even more preferably 0.05 parts by mass or more. Meanwhile, the upper limit of the content of the surfactant is preferably, but not particularly limited to, 10 parts by mass or less based on 100 parts by mass of the PVA, more preferably 1 part by mass or less, even more preferably 0.5 parts by mass or less, and particularly preferably 0.3 parts by mass or less. The content of the surfactant in the above range allows better releasability of the PVA film from the film formation apparatus during production and causes less problems, such as blocking of the PVA films with each other. The problems of bleeding out of the surfactant on a surface of the PVA film, deterioration of the appearance of the PVA film due to aggregation of the surfactant, and the like are also less likely to occur.

Other Components

In addition to the plasticizer, the starch, the water-soluble polymer other than PVA, and the surfactant, without impairing the effects of the present invention, the PVA film may contain components, such as moisture, antioxidants, ultraviolet absorbers, lubricants, cross-linking agents, colorants, fillers, antiseptics, mildewcides, and other polymer compounds.

The ratio of the summed mass of the PVA, the plasticizer, the starch, the water-soluble polymer other than PVA, and the surfactant to the total mass of the PVA film is preferably, but not particularly limited to, from 60 to 100 mass %, more preferably from 80 to 100 mass %, and even more preferably from 90 to 100 mass %.

Water-Soluble Film

Complete dissolution time of the water-soluble film (PVA film) of the present invention immersed in deionized water at 10° C. is preferably, but not particularly limited to, in a range below. That is, the upper limit of the complete dissolution time is preferably 150 seconds or less, more preferably 90 seconds or less, even more preferably 60 seconds or less, and particularly preferably 45 seconds or less. The PVA film having the upper limit of the complete dissolution time in the above range completes the dissolution relatively early and thus is preferably used as a film for packaging (packaging material for) chemicals and the like. Meanwhile, the lower limit of the complete dissolution time is preferably, but not particularly limited to, 5 seconds or more, more preferably 10 seconds or more, even more preferably 15 seconds or more, and particularly preferably 20 seconds or more. The PVA film having the not excessively short complete dissolution time causes less problems, such as blocking of the PVA films with each other and reduction in the mechanical strength due to absorption of moisture in the atmosphere.

The complete dissolution time when the PVA film is immersed in deionized water at 10° C. is measured as follows.

<1> The PVA film is left in a thermohygrostat conditioned at 20° C.-65% RH for 16 hours or more for humidity control.

<2> A rectangular sample with a length of 40 mm×a width of 35 mm is cut from the humidity controlled PVA film and then sandwiched for fixation between two 50 mm×50 mm plastic plates having a rectangular window (hole) with a length of 35 mm×a width 23 mm in a position where the longitudinal direction of the sample is parallel to the longitudinal direction of the window and the window is approximately at the center in the sample width direction.

<3> In a 500 mL beaker, 300 mL of deionized water is put and the water temperature is adjusted at 10° C. while stirring with a magnetic stirrer having a bar with a length of 3 cm at the number of revolutions of 280 rpm.

<4> The sample fixed to the plastic plates in <2> above is immersed in the deionized water in the beaker with attention not to contact the bar of the magnetic stirrer.

<5> The time from the immersion in the deionized water to complete disappearance of the sample pieces dispersed in the deionized water is measured.

The thickness of the PVA film is preferably, but not particularly limited to, in a range below. That is, the upper limit of the thickness is preferably 200 µm or less, more preferably 150 µm or less, even more preferably 100 µm or less, and particularly preferably 50 µm or less. Meanwhile, the lower limit of the thickness is preferably, but not particularly limited to, 5 µm or more, more preferably 10 µm or more, even more preferably 15 µm or more, and particularly preferably 20 µm or more. The thickness in the above range is not excessively large and thus preferably allows preventing worsening of fabricability of the PVA film while it is not excessively small and thus allows maintaining sufficient mechanical strength of the PVA film. In particular, in the present invention, the amount (A1) of crystalline component and the amount (A2) of constrained amorphous component set in the predetermined ranges allow a PVA film even with a relatively small thickness to maintain high mechanical strength.

It should be noted that the thickness of the PVA film may be obtained as an average value of thicknesses measured at ten arbitrary spots (e.g., ten arbitrary spots on a straight line in the longitudinal direction of the PVA film).

Method of Producing Water-Soluble Film

A method of producing the water-soluble film (PVA film) of the present invention is not particularly limited and it is possible to use, for example, an arbitrary method as below.

Examples of the method of producing the water-soluble film include: a film formation method where a solvent, additives, and the like are added to PVA and homogenized to obtain a film forming stock solution to be subjected to casting film formation, wet film formation (discharge into a poor solvent), dry/wet film formation, gel film formation (a method where the film forming stock solution is temporarily cooled to form a gel and then the solvent is extracted and removed), and in combination of the methods described above, melt extrusion film formation where the film forming stock solution thus obtained is extruded from a T die or the like using an extruder or the like, inflation molding, and the like. Among the methods mentioned above, the method of producing the PVA film is preferably casting film formation or melt extrusion film formation. Use of casting film formation or melt extrusion film formation allows a homogeneous PVA film to be productively obtained.

A description is given below to a case of producing the PVA film using casting film formation or melt extrusion film formation.

In a case of producing the PVA film using casting film formation or melt extrusion film formation, a film forming stock solution is prepared at first that contains PVA, a solvent, additives, such as the plasticizer, as needed. It should be noted that, in the case of the film forming stock solution containing the additives, the ratio of the additives to PVA in the film forming stock solution is substantially equal to the above-described ratio of the additives to PVA in the PVA film.

The film forming stock solution is then casted (fed) in the form of film on a rotating support, such as a metal roll and a metal belt. A liquid coating of the film forming stock solution is thus formed on the support. The liquid coating is heated on the support to remove the solvent and thus solidified to be formed into a film.

The solidified long film (PVA film) is released from the support, dried as needed by a drying roll, a drying furnace, and the like, and further heat treated as needed to be wound in rolls.

In the drying process of the liquid coating casted on the support (solvent removal process) and the following drying process of the PVA film, crystallization proceeds while the PVA is heated. Particularly, heating in a region with a high moisture content increases the mobility of the molecular chain of the PVA and thus crystallization proceeds, causing the amount (A2) of constrained amorphous component to be likely to decrease and the amount (A1) of crystalline component to be likely to increase. It is thus possible to control the degree of crystallization of the PVA by the drying rate in the drying process. For example, a faster drying rate inhibits crystal growth and exhibits a tendency to reduce the amount (A1) of crystalline component. In contrast, a slower drying rate accelerates crystal growth and exhibits a tendency to increase (A1/A2). A greater amount of heat to be provided causes an increase in the amount (A1) of crystalline component and exhibits a tendency to reduce the water solubility of the PVA.

It should be noted that the drying rate may be adjusted by the temperature of the support, the contact time with the support, the temperature and the amount of hot air, the temperatures of the drying roll and the drying furnace, and the like.

The ratio of volatile components (concentration of the volatile components, such as the solvent removed by volatilization and evaporation during film formation and the like) in the film forming stock solution is preferably, but not particularly limited to, from 50 to 90 mass % and more preferably from 55 to 80 mass %. The ratio of volatile components in the above range allows adjustment of the viscosity of the film forming stock solution in a preferred range, thereby improving film formability of the PVA film (liquid coating) and facilitating production of the PVA film with a uniform thickness. The ratio of volatile components in the film forming stock solution is appropriate and thus the crystallization of the PVA on the support moderately proceeds to facilitate balancing the amount (A2) of constrained amorphous component and the amount (A1) of crystalline component.

In this context, the "ratio of volatile components in the film forming stock solution" herein means a value obtained by the following formula.

$$\text{Ratio of Volatile Components in Film Forming Stock Solution (mass \%)} = \{(Wa-Wb)/Wa\} \times 100 \quad \text{(Math 5)}$$

In the formula, Wa denotes the mass (g) of the film forming stock solution and Wb denotes the mass (g) of the film forming stock solution after Wa (g) of the solution is dried in an electric heat drier at 105° C. for 16 hours.

Examples of the method of adjusting the film forming stock solution include, but not particularly limited to, a method where PVA and the additives, such as a plasticizer and a surfactant, are dissolved in a dissolution tank or the like, a method where PVA in a hydrated state is melt kneaded together with the additives, such as a plasticizer and a surfactant, using a single- or twin-screw extruder, and the like.

The surface temperature of the support for casting of the film forming stock solution is preferably, but not particularly limited to, from 50° C. to 110° C., more preferably from 60° C. to 100° C., and even more preferably from 65° C. to 95° C. The surface temperature in the above range causes drying of the liquid coating to proceed at a moderate rate and thus prevents an excessive increase in the amount (A1) of crystalline component, and also causes the drying of the liquid coating to take not too long time and thus the productivity of the PVA film is not reduced. The drying of the liquid coating proceeding at a moderate rate is less likely to cause irregularities, such as foaming, generated on a surface of the PVA film and thus preferably prevents an excessive increase in the amount (A3) of amorphous component and a relatively excessive reduction in the amount (A2) of constrained amorphous component.

Simultaneously with heating of the liquid coating on the support, hot air at a wind velocity from 1 to 10 m/second may be uniformly blown on the entire region on a non-contact surface side of the liquid coating. This allows regulation of the drying rate of the liquid coating. The temperature of the hot air blown on the non-contact surface side is preferably, but not particularly limited to, from 50° C. to 150° C. and more preferably from 70° C. to 120° C. The temperature of the hot air in the above range allows a greater increase in the drying efficiency of the liquid coating, uniformity of drying, and the like.

When the feeding rate (discharge rate) of the film forming stock solution on the support is S0 [m/second] and the rotation speed (peripheral speed) of the support is S1 [m/second], a ratio (S1/S0) of the rotation speed (peripheral speed) S1 of the support to the feeding rate (discharge rate) S0 of the film forming stock solution on the support is preferably in a range below. That is, the upper limit of (S1/S0) is preferably, but not particularly limited to, 7 or less, more preferably 6.8 or less, and even more preferably 6.5 or less. Meanwhile, the lower limit of (S1/S0) is preferably, but not particularly limited to, more than 3, more preferably more than 5, even more preferably more than 5.2, and particularly preferably more than 5.5. (S1/S0) in the above range causes the crystallization due to the orientation of the molecular chain of the PVA in the liquid coating to moderately proceed and the amount (A1) of crystalline component to be appropriate. It is also possible to inhibit deformation of the liquid coating due to the gravity between the die lips and the support, and thus problems, such as uneven thickness, are less likely to occur in the PVA film.

It should be noted that the feeding rate (S0) of the film forming stock solution means a linear velocity in the flow direction of the film forming stock solution. Specifically, it is possible to obtain the feeding rate (S0) of the film forming stock solution by dividing the volume of the film forming stock solution fed (discharged) from a film-form discharge apparatus per unit time by an opening area (the product of the slit width and an average value of the degrees of slit opening of the film-form discharge apparatus) of the slit of the film-form discharge apparatus.

The PVA film is preferably dried (solvent removal) to a ratio of volatile components from 5 to 50 mass % on the support and then released from the support and further dried as needed.

Examples of the drying method include, but not particularly limited to, a method including passing through a drying furnace and a method including contacting a drying roll.

In the case of drying the PVA film using a plurality of drying rolls, it is preferred that one surface and the other surface of the PVA film alternately contact the drying rolls. This allows homogenization of the degree of crystallization of PVA on both surfaces of the PVA film. In this case, the number of drying rolls is preferably, but not particularly limited to, three or more, more preferably four or more, and even more preferably from 5 to 30.

The temperature of the drying furnace or the drying roll(s) is preferably, but not particularly limited to, from 40° C. to 110° C. The upper limit of the temperature of the drying furnace or the drying roll(s) is more preferably 100° C. or less, even more preferably 90° C. or less, and particularly preferably 85° C. or less. Meanwhile, the lower limit of the temperature of the drying furnace or the drying roll(s) is more preferably, but not particularly limited to, 45° C. or more and even more preferably 50° C. or more. The temperature of the drying furnace or the drying roll(s) in the above range facilitates balancing the amount (A1) of crystalline component and the amount (A3) of amorphous component.

The PVA film after drying may further be heat treated as needed. The heat treatment allows adjustment of the properties, such as mechanical strength, water solubility, and index of double refraction, of the PVA film.

The temperature of the heat treatment is preferably, but not particularly limited to, from 60° C. to 135° C. The upper limit of the heat treatment temperature is more preferably 130° C. or less. The temperature of the heat treatment in the above range allows the amount of heat provided to the PVA film not to be excessive and the amount (A1) of crystalline component to be appropriately adjusted.

The PVA film thus produced is subjected to further humidity control, cutting of both edges (trimmings) of the film, and the like as needed, and then wound in rolls on a cylindrical core and moisture proof packaged to be a product.

The ratio of volatile components in the PVA film finally obtained through the series of treatment is preferably, but not particularly limited to, from 1 to 5 mass % and more preferably from 2 to 4 mass %.

Applications

The water-soluble film (PVA film) of the present invention has excellent balance between the water solubility and the mechanical strength and preferably used in various film applications to which general water-soluble films are applied.

Examples of the film applications include packaging films for chemicals, base films for hydraulic transfer printing, base films for embroidery, mold release films for artificial marble molding, packaging films for seeds, films for sanitary container bags, and the like. Among the films mentioned above, the water-soluble film of the present invention is preferably applied to the packaging films for chemicals to obtain even marked effects of the present invention.

In the case of applying the water-soluble film of the present invention to packaging films for chemicals, examples of the kind of chemical include pesticides, detergents (including bleaches), germicides, and the like.

The properties of the chemicals are not particularly limited and may be acidic, neutral, or alkaline.

The chemicals may contain boron-containing compound(s) and/or halogen-containing compound(s).

The form of the chemicals may be in any of powder, bulk, gel, and liquid.

The form of package is preferably, but not particularly limited to, unit packaging to package (preferably, seal package) the chemicals per unit amount.

A package of the present invention is obtained by packaging a chemical by applying the water-soluble film of the present invention to a packaging film for chemicals. In other words, the package of the present invention includes a packaging material (capsule) composed of the water-soluble film of the present invention and a chemical encapsulated in the packaging material.

EXAMPLES

Although the present invention is specifically described below by way of Examples and the like, the present invention is not at all limited by Examples below. It should be noted that, in Examples and Comparative Example below, evaluation items and evaluation methods were used as follows.

(1) Quantification of Amount (A1) of Crystalline Component, Amount (A2) of Constrained Amorphous Component, and Amount (A3) of Amorphous Component by $^1$H Pulse NMR At first, 25 mg of a water-soluble film was cut in size of approximately 5 mm×5 mm to obtain a sample, and then the sample was contained in an NMR tube with an inner diameter of 10 mm.

Then, into the NMR tube containing the sample, 1 mL of deuterated methanol was fed and left at room temperature for 24 hours.

Then, $^1$H pulse NMR measurement of the sample was performed under conditions below using the pulse NMR measurement apparatus to obtain a spin-spin relaxation curve.

Measurement Apparatus: NMR Analyzer mq20 the minispec (manufactured by BRUKER)
Pulse Sequence: Solid-Echo
Pulse Width: 7.22 µs
Pulse Repetition Interval: 1 s
Dummy Shoot: 0
Pulsed Atten: 0 dB
Number of Accumulation: 32 times
Measurement Temperature: 40° C.
Gain: from 70 to 110 dB (regulated in accordance with observation intensity of sample)

By fitting the spin-spin relaxation curve thus obtained using the method described above, the amount (A1) of crystalline component, the amount (A2) of constrained amorphous component, and the amount (A3) of amorphous component in the sample were quantitated.

(2) Complete Dissolution Time of Water-Soluble Film

The complete dissolution time of the water-soluble film in deionized water at 10° C. was obtained by the method described above.

(3) Transport Test

At first, two samples cut into 50×70 mm were overlaid and heat sealed on three sides to prepare a pouch.

Approximately 35 g of a detergent was put in the pouch thus obtained and heat sealed on an upper portion (opening) of the pouch for tight closure to prepare a package.

It should be noted that the detergent had composition of 8 mass % of monoethanolamine, 24 mass % of dodecylbenzenesulfonic acid, 20 mass % of oleic acid, 24 mass % of lauryl alcohol ethoxylate, 9 mass % of propylene glycol, 9 mass % of diethylene glycol, and 6 mass % of water.

A hundred packages thus obtained were then packed in a 45 L polyethylene bag, and the polyethylene bag was put in a corrugated cardboard carton (320×335×325 cm). A gap between the polyethylene bag and the corrugated cardboard carton was filled with cushioning.

The corrugated cardboard carton containing the packages was then loaded onto a truck to perform a transport test of travelling between Okayama Prefecture and Tokyo Prefecture, Japan, ten times.

The packages after transport were visually observed to check the total number of torn packages and clearly deformed packages.

Example 1

A film forming stock solution was prepared at first by adding 100 parts by mass of PVA (degree of saponification of 88 mol %, viscosity-average degree of polymerization of 1700) obtained by saponifying polyvinyl acetate, 10 parts by mass of glycerin as the plasticizer, 0.1 part by mass of lauric acid diethanolamide as the surfactant, and water. It should be noted that the ratio of volatile components in the film forming stock solution was 68 mass %.

The film forming stock solution was then discharged in the form of film on a metal roll (surface temperature of 80° C.) as the support from a T die to form a liquid coating on the metal roll. On the metal roll, hot air at 85° C. was blown for drying at a rate of 5 m/second on the entire surface of the liquid coating not in contact with the metal roll. A PVA film was thus obtained. It should be noted that the ratio (S1/S0) of the peripheral speed (S1) of the metal roll to the discharge rate (S0) of the film forming stock solution on the metal roll was 4.8.

The PVA film was then released from the metal roll and dried by alternately contacting one surface and the other surface of the PVA film with drying rolls and then was wound on a cylindrical core in rolls. It should be noted that the surface temperature of each drying roll was set at approximately 75° C. The PVA film thus obtained had a thickness of 35 µm and a width of 1200 mm.

The film thus obtained was subjected to $^1$H pulse NMR measurement and the amount (A1) of crystalline component was 23%, the amount (A2) of constrained amorphous component was 42%, the amount (A3) of amorphous component was 35%, (A1/A2) was 0.55, and (A2/A3) was 1.20.

The complete dissolution time of the PVA film thus obtained was measured, and the complete dissolution time was 41 seconds.

Packages prepared by the PVA film thus obtained were subjected to the transport test, and no torn packages were found in the packages after transport.

Examples 2 and 3 and Comparative Example 1

PVA films were obtained in the same manner as in Example 1 except for changing the amount of glycerin to be added used for preparation of the film forming stock solution respectively to 25 parts by mass, 45 parts by mass, and 5 parts by mass.

Example 4

A PVA film was obtained in the same manner as in Example 2 except for changing the surface temperature of the metal roll on which the film forming stock solution was discharged to 85° C.

Example 5

A PVA film was obtained in the same manner as in Example 3 except for changing the PVA used for preparation of the film forming stock solution to maleic acid monomethyl ester (MMM) modified PVA (degree of saponification of 90 mol %, degree of polymerization of 1700, amount of MMM modification of 5 mol %).

It should be noted that maleic acid monomethyl ester modified PVA is abbreviated as "MMMΔ5" in Table 1.

Example 6

A PVA film was obtained in the same manner as in Example 2 except for changing the PVA used for preparation of the film forming stock solution to acrylamide-2-methylpropanesulfonic acid sodium salt (AMPS) modified PVA (degree of saponification of 88 mol %, degree of polymerization of 1700, amount of AMPS modification of 2 mol %).

It should be noted that acrylamide-2-methylpropanesulfonic acid sodium salt modified PVA is abbreviated as "AMPSΔ2" in Table 1.

Comparative Examples 2 and 3

PVA films were obtained in the same manner as in Example 1 except for changing the surface temperature of the metal roll on which the film forming stock solution was discharged respectively to 60° C. and 120° C.

Comparative Example 4

A PVA film was obtained in the same manner as in Example 1 except for changing the PVA used for preparation of the film forming stock solution to highly saponified PVA (degree of saponification of 99 mol %, degree of polymerization of 1700).

Comparative Example 5

A PVA film was obtained in the same manner as in Example 1 except for changing (S1/S0) for discharging the film forming stock solution to 48.

Comparative Example 6

A PVA film was obtained in the same manner as in Example 1 except for performing further heat treatment at 140° C. to the PVA film after drying.

The evaluation results of the water-soluble films thus obtained are shown in Table 1.

TABLE 1

| Modification | Example 1 Unmodified | Example 2 Unmodified | Example 3 Unmodified | Example 4 Unmodified | Example 5 MMMΔ5 | Example 6 AMPSΔ2 |
|---|---|---|---|---|---|---|
| Degree of Saponification [mol %] | 88 | 88 | 88 | 88 | 90 | 88 |
| Amount of Plasticizer [mass %/PVA] | 10 | 25 | 45 | 25 | 45 | 25 |
| Metal Roll Temperature [° C.] | 80 | 80 | 80 | 85 | 80 | 80 |
| S1/S0 | 4.8 | 4.8 | 4.8 | 4.8 | 4.8 | 4.8 |
| Heat Treatment Temperature [° C.] | — | — | — | — | — | — |
| A1 [%] | 23 | 32 | 43 | 48 | 24 | 16 |
| A2 [%] | 42 | 35 | 12 | 22 | 30 | 31 |
| A3 [%] | 35 | 33 | 45 | 30 | 46 | 53 |
| A1/A2 | 0.55 | 0.91 | 3.58 | 2.18 | 0.80 | 0.52 |
| A2/A3 | 1.20 | 1.06 | 0.27 | 0.73 | 0.65 | 0.58 |
| Complete Dissolution Time [sec] | 41 | 43 | 49 | 59 | 21 | 15 |
| Deformation/Tear in Transport Test | 0 | 0 | 1 | 0 | 0 | 1 |

| | Comparative Example 1 Unmodified | Comparative Example 2 Unmodified | Comparative Example 3 Unmodified | Comparative Example 4 Unmodified | Comparative Example 5 Unmodified | Comparative Example 6 Unmodified |
|---|---|---|---|---|---|---|
| Degree of Saponification [mol %] | 88 | 88 | 88 | 99 | 88 | 88 |
| Amount of Plasticizer [mass %/PVA] | 5 | 10 | 10 | 10 | 10 | 10 |
| Metal Roll Temperature [° C.] | 80 | 60 | 120 | 80 | 80 | 80 |
| S1/S0 | 4.8 | 4.8 | 4.8 | 4.8 | 48 | 4.8 |
| Heat Treatment Temperature [° C.] | — | — | — | — | — | 140 |
| A1 [%] | 18 | 61 | 5 | 69 | 58 | 72 |
| A2 [%] | 52 | 11 | 58 | 11 | 9 | 8 |
| A3 [%] | 20 | 28 | 37 | 20 | 33 | 20 |
| A1/A2 | 0.35 | 5.55 | 0.09 | 6.27 | 6.44 | 9.00 |
| A2/A3 | 2.60 | 0.39 | 1.57 | 0.55 | 0.27 | 0.40 |
| Complete Dissolution Time [sec] | 35 | 77 | 70 | >600 | 81 | 121 |
| Deformation/Tear in Transport Test [number] | 5 | 5 | 18 | 0 | 7 | 3 |

As shown in Table 1, it was confirmed that changing at least one of the kind of PVA, the amount of the plasticizer, the surface temperature of the support (metal roll), the value of (S1/S0), and with or without additional heat treatment allowed adjustment of the amount (A1) of crystalline component, the amount (A2) of constrained amorphous component, and the amount (A3) of amorphous component in the PVA film.

The PVA film in each Example having the amount (A1) of crystalline component of 60% or less and the amount (A2) of constrained amorphous component from 10% to 50% was excellent in both water solubility and mechanical strength. In contrast, the PVA film in each Comparative Example not satisfying the above conditions was poor in at least one of water solubility and mechanical strength.

The invention claimed is:

1. A water-soluble film comprising a polyvinyl alcohol resin, wherein:
    the polyvinyl alcohol resin has a degree of saponification from 64 to 91 mol %, the water-soluble film has:
        an amount (A1) of crystalline component from 20% to 60%, based on a total sum of A1, A2, and A3,
        an amount (A2) of constrained amorphous component from 15% to 50%, based on the total sum of A1, A2, and A3, and
        an amount (A3) of amorphous component from 10% to 70%, based on the total sum of A1, A2, and A3,
    the amounts being obtained from a spin-spin relaxation curve by $^1$H pulse NMR measurement of the water-soluble film in deuterated methanol, and
    complete dissolution time of the water-soluble film immersed in deionized water at 10° C. is 90 seconds or less.

2. The water-soluble film according to claim 1, wherein a ratio (A1/A2) of the amount (A1) of crystalline component to the amount (A2) of constrained amorphous component is from 0.1 to 5.

3. The water-soluble film according to claim 1, wherein a ratio (A2/A3) of the amount (A2) of constrained amorphous component to the amount (A3) of amorphous component obtained from the spin-spin relaxation curve is 1.5 or less.

4. The water-soluble film according to claim 1, wherein the water-soluble film has a thickness of 200 μm or less.

5. A method of producing the water-soluble film according to claim 1, comprising:
    preparing a film forming stock solution containing the polyvinyl alcohol resin and a solvent;
    forming a liquid coating by feeding the film forming stock solution on a rotating support; and
    obtaining the water-soluble film by removing the solvent from the liquid coating on the support.

6. The method of producing the water-soluble film according to claim 5, wherein the film forming stock solution further contains 10 parts by mass or more of a plasticizer based on 100 parts by mass of the polyvinyl alcohol resin.

7. The method of producing the water-soluble film according to claim 5, wherein S1/S0 is 7 or less when a feeding rate of the film forming stock solution on the support is S0 [m/second] and a rotation speed of the support is S1 [m/second].

8. The method of producing the water-soluble film according to claim 5, wherein the support has a surface temperature from 50° C. to 110° C.

9. The method of producing the water-soluble film according to claim 5, further comprising heat treating the water-soluble film thus obtained at a temperature from 60° C. to 135° C.

10. A package comprising:
    a packaging material composed of the water-soluble film according to claim 1; and
    a chemical encapsulated in the packaging material.

11. The package according to claim 10, wherein the chemical is a pesticide, a detergent, or a germicide.

12. The water-soluble film according to claim 1, wherein complete dissolution time of the water-soluble film immersed in deionized water at 10° C. is 60 seconds or less.

13. The water-soluble film according to claim 1, wherein the water-soluble film is formed by a process including:
    casting a solution including the polyvinyl alcohol resin on a support having a surface temperature from 65° C. to 110° C. to form a film.

14. The water-soluble film according to claim 13, wherein S1/S0 is more than 3 and 7 or less,
    wherein S0 (m/second) is a feeding rate of the solution on the support is, and
    wherein S1 (m/second) is a rotation speed of the support.

15. The water-soluble film according to claim 1, wherein the water- soluble film has:
    the amount (A1) from 20% to 60%, based on the total sum of A1, A2, and A3, and
    the amount (A2) from 20% to 50%, based on the total sum of A1, A2, and A3.

16. A water-soluble film comprising a polyvinyl alcohol resin, the polyvinyl alcohol resin having a degree of saponification from 64 to 91 mol %,
    wherein the water-soluble film has:
        an amount (A1) of crystalline component;
        an amount (A2) of constrained amorphous component; and
        an amount (A3) of amorphous component,
    wherein the amount (A1) of crystalline component is from 20% to 60%, based on a total sum of A1, A2, and A3,
    wherein the amount (A2) of constrained amorphous component is from 15% to 50%, based on the total sum of A1, A2, and A3,
    wherein the amount (A1), the amount (A2), and the amount (A3) are obtained from a spin-spin relaxation curve by $^1$H pulse NMR measurement of the water-soluble film in deuterated methanol, and
    wherein complete dissolution time of the water-soluble film immersed in deionized water at 10° C. is 90 seconds or less.

17. The water-soluble film according to claim 16, wherein a ratio (A1/A2) of the amount (A1) of crystalline component to the amount (A2) of constrained amorphous component is from 0.1 to 5,
    wherein a ratio (A2/A3) of the amount (A2) of constrained amorphous component to an amount (A3) of amorphous component obtained from the spin-spin relaxation curve is 1.5 or less, and
    wherein the water-soluble film has a thickness of 200 μm or less.

18. The water-soluble film according to claim 16, wherein the complete dissolution time of the water-soluble film immersed in deionized water at 10° C. is 60 seconds or less.

19. The water-soluble film according to claim 16, wherein the water-soluble film is formed by a process including:

casting a solution including the polyvinyl alcohol resin on a support having a surface temperature from 65° C. to 110° C. to form a film.

\* \* \* \* \*